United States Patent
Muniere

(10) Patent No.: US 7,095,717 B2
(45) Date of Patent: Aug. 22, 2006

(54) METHOD FOR MULTIPLEXING TWO DATA FLOWS ON A RADIO COMMUNICATION CHANNEL AND CORRESPONDING TRANSMITTER

(75) Inventor: Vincent Muniere, Paris (FR)

(73) Assignee: Alcatel, Paris (FR)

( * ) Notice: Subject to any disclaimer, the term of this patent is extended or adjusted under 35 U.S.C. 154(b) by 892 days.

(21) Appl. No.: 10/105,422

(22) Filed: Mar. 26, 2002

(65) Prior Publication Data

US 2002/0141454 A1    Oct. 3, 2002

(30) Foreign Application Priority Data

Mar. 30, 2001  (EP)  .................................  01440091

(51) Int. Cl.
    *H04J 1/16*    (2006.01)
(52) U.S. Cl. ........................ 370/232; 370/329; 370/342
(58) Field of Classification Search ................ 370/329, 370/231, 232, 230, 335, 342, 441; 707/1
    See application file for complete search history.

(56) References Cited

U.S. PATENT DOCUMENTS 5,539,729 A    7/1996  Bodnar ....................... 370/232

6,400,699 B1 *  6/2002  Airy et al. ................... 370/329

FOREIGN PATENT DOCUMENTS

DE        199 07 085 C1    4/2000

* cited by examiner

*Primary Examiner*—John Pezzlo
(74) *Attorney, Agent, or Firm*—Sughrue Mion, PLLC

(57) ABSTRACT

A method for multiplexing two data flows on a radio communication channel of a radio communication network, each of the data flows having data packets to be transmitted on the radio communication channel. There are data packets belonging to a first data flow, herein called high priority data flow, and data packets belonging to a second data flow, herein called low priority data flow. In the method, at least one available data packet belonging to the low priority data flow is transmitted if the number of consecutive data packets belonging to the high priority data flow transmitted since the transmission of the latest data packet belonging to the low priority data flow has reached a predefined number of data packets.

11 Claims, 3 Drawing Sheets

METHOD FOR MULTIPLEXING TWO DATA FLOWS ON A RADIO COMMUNICATION CHANNEL AND CORRESPONDING TRANSMITTER

BACKGROUND OF THE INVENTION

The present invention relates to radio communication networks and more precisely to a method for multiplexing two data flows on one radio communication channel.

Transmitters of a radio communication networks usually have to transmit several data flows simultaneously. These data flows may consist in several types of traffic data having several priorities or in signaling messages. Schematically, the transmitter may be represented as supporting as many queues as data flows to transmit simultaneously.

In some radio communication systems the data flows can be transmitted in parallel on independent communication channels. However, in some other radio communication networks, the different data flows have to share the same radio communication channel or at least be processed sequentially at the transmitter so that a completely parallel processing of the different data flow is impossible.

With regard to this matter of facts, a policy determining how the different data flows have to be multiplexed on the single radio communication channel has to be defined at the transmitter. Several usual policies can be envisaged. Usually, each data flow is divided in a succession of data packets, the multiplexing policy being applied at the level of data packets.

One very simple policy named round robin consists in checking each data flow one after the other, in a predefined order. If data packets are available for transmission, one data packet is transmitted on the radio communication channel in the corresponding time slot, if not the next data flow is checked.

Another policy consists in attributing different priorities to the different data flows, a data flow with a higher priority being allowed to transmit data packets with a higher priority than a data flow with a lower priority.

Usually, the data flows with highest priority correspond to the traffic data requiring real time constraints as voice traffic or video. The data flows with lower priority corresponding to non real time traffic data.

Signaling messages, especially signaling messages required for the maintenance of the radio link (e.g. handover messages) occurring during the traffic data transmission phase should be granted the highest priority on the radio communication channel. For example, a handover procedure should be granted a higher priority than the traffic data (even real time traffic data) since the latter will no more be correctly received so long as the handover has not been performed.

However, in recent radio communication systems like GSM/EDGE or UMTS, some signaling messages cannot be contained in one single data packet and have to be segmented in several signaling data packets. The transmission of the complete signaling message (i.e. N signaling data packets) with the highest priority results in that the transmission of data packets belonging to other data flows with lower priority is stopped until the signaling message has been correctly transmitted. If the other data flows are carrying real-time data, the long interruption of transmission for this data flow results in either irrecoverable delay or long muting in the real-time data packet transmission.

This problem is automatically solved in GERAN A/Gb mode using LAPDm as its layer 2 communication protocol for the signaling plane. Indeed, this communication protocol enables only the transmission of a further data packet when an acknowledgement for the preceding packet has been received at the transmitter. This is due to the fact that the transmit window size is limited to one. Then, automatically, the delay between the transmission of two high priority data packets is at least equal to one round trip delay, which is the minimum time required for the transmitter to send a data packet and receive its acknowledgement from the receiving entity. During this time, data packets belonging to traffic data flows with lower priority can be transmitted, reducing to the minimum either the delay in real-time data packets transmission or the pre-emption duration. In this solution, the total time required for transmitting a signaling message segmented in several data packets is very long.

However, when using for the transmission of signaling messages a more efficient layer-2 protocol supporting large sending and receiving windows like the Radio Link Control Protocol as specified in TS 3GPP 44.060 (i.e. not waiting for an acknowledgement of the previous data packet for transmitting the next one), the problem described above remains unsolved.

A particular object of the present invention is to provide a method for multiplexing two data flows guaranteeing that the data flow having the highest priority is transmitted as fast as possible while not delaying or muting too much the transmission of data flow with a lower priority having however real-time constraints.

Another object of the invention is to provide a transmitter of a radio communication network satisfying the two conditions listed above.

SUMMARY OF THE INVENTION

These objects, and others that appear below, are achieved by a method for multiplexing at least two data flows on a radio communication channel of a radio communication network, each of said data flows comprising data packets to be transmitted on said radio communication channel, data packets belonging to a first of said data flows, herein called high priority data flow, having higher transmission priority than data packets belonging a second of said data flows, herein called low priority data flow, said method comprising the step of transmitting, if available, at least one data packet belonging to said low priority data flow when the number of consecutive data packets belonging to said high priority data flow transmitted since the transmission of the latest data packet belonging to said low priority data flow has reached a predefined number of data packets.

These objects are also achieved by a transmitter of a radio communication network comprising means for multiplexing at least two data flows on a radio communication channel, each of said data flows comprising data packets to be transmitted on said radio communication channel, data packets belonging to a first of said data flows, herein called high priority data flow, having higher priority than data packets belonging to a second of said data flows, herein called low priority data flow, wherein said means for multiplexing two data flows comprises:

means for counting the number of consecutive data packets belonging to said high priority data flow transmitted since the transmission of the latest data packet belonging to said low priority data flow;

means for enabling the transmission, if available, of at least one data packet belonging to said low priority data flow if said number of consecutive data packets belonging to said high priority data flow has reached a predefined number of data packets.

According to the present invention, the two data flows are multiplexed in such a way that the number of consecutive data packets belonging to the high priority data flow is limited to a predefined number of data packets.

The present invention has the advantage to accelerate the transmission of data packets belonging to the high priority data flow while guaranteeing enough transmission opportunities for data packets belonging to the low priority data flow in order not to interrupt the transmission of data packets belonging to the low priority data flow during a too long time that would cause irrecoverable delay or long muting for real time applications.

In a preferred embodiment, a minimum time interval is provided for data packets belonging to the low priority data flow to be transmitted before a further data packet belonging to the high priority data flow is transmitted.

This allows to fine tune the needs of the real-time data flow in that this time interval can be adapted to the specific requirements of the real-time application behind the low priority data flow.

Further advantageous features of the invention are defined in the dependent claims.

This invention is based on a priority application EP 01 44 0091 which is hereby incorporated by reference.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

Figure 1:
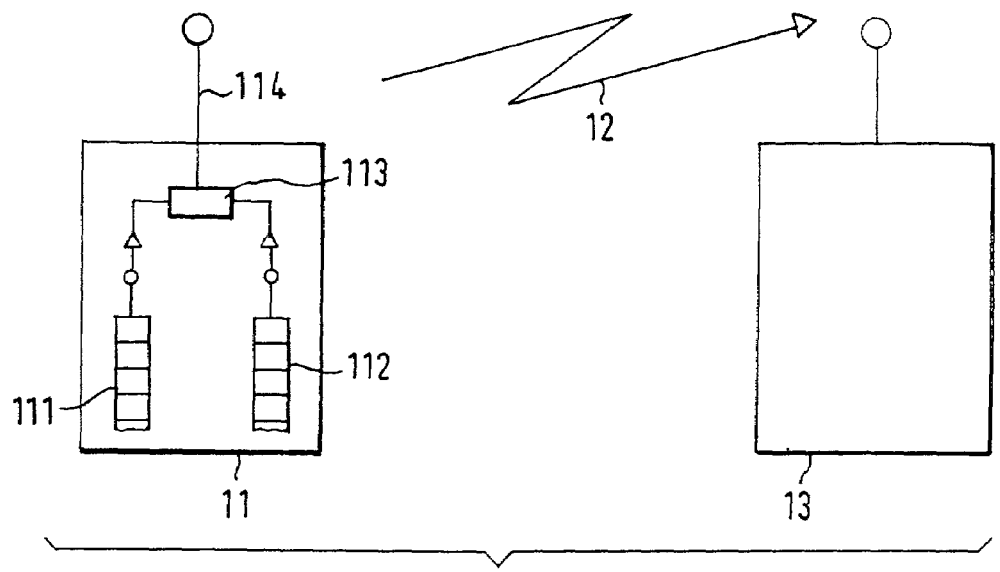
FIG. 1 shows a simplified radio communication system where the method according to the present invention can be used.

FIG. 1 represents a simplified radio communication system where the method according to the present invention can be used. The radio communication system comprises a transmitter 11, a radio communication channel 12 and a receiver 13. Transmitter 11 is either a base station of the radio communication network or a radio terminal and receiver 13 vice-versa. However the invention can also be used in a transmitter being a radio terminal.

The simplified radio communication network is preferably a GERAN (GSM/EDGE Radio Access Network) functioning in a circuit switched mode (i.e. connected over an A or Iu-cs interface to a mobile switching center) supporting voice services with real-time constraints.

Alternatively, the simplified radio communication network can be a GERAN functioning in a packet switched mode (i.e. connected over an Iu-ps interface to a Serving GPRS Support Node) supporting real time services as voice or video services.

Transmitter 11 comprises two independent data flows 111, 112 containing data packets. The two data flows are multiplexed at multiplexer 113 according to the method of the present invention before being transmitted over radio communication channel 12. Both data flows 111, 112 are each treated as data queues processed with a First-in first out mechanism by multiplexer 113.

Data flow 111 is herein called high priority data flow while data flow 112 is herein called low priority data flow. Preferably, high priority data flow 111 comprises signaling messages generated by a layer-3 protocol, segmented in several data packets and queued in high priority data flow 111. Such signaling messages are for example "handover command" or "handover complete" messages occurring during the traffic data transmission phase.

Preferably, low priority data flow 112 comprises traffic data packets with real-time constraints i.e. short transmission delay and extremely low jitter as voice or video data packets.

Multiplexer 113 has the role to select the data flow 111 or 112 from which one data packet will be transmitted on radio communication channel 12 in the next frame. This algorithm is part of the present invention and will be precisely described in the following.

Figure 2:
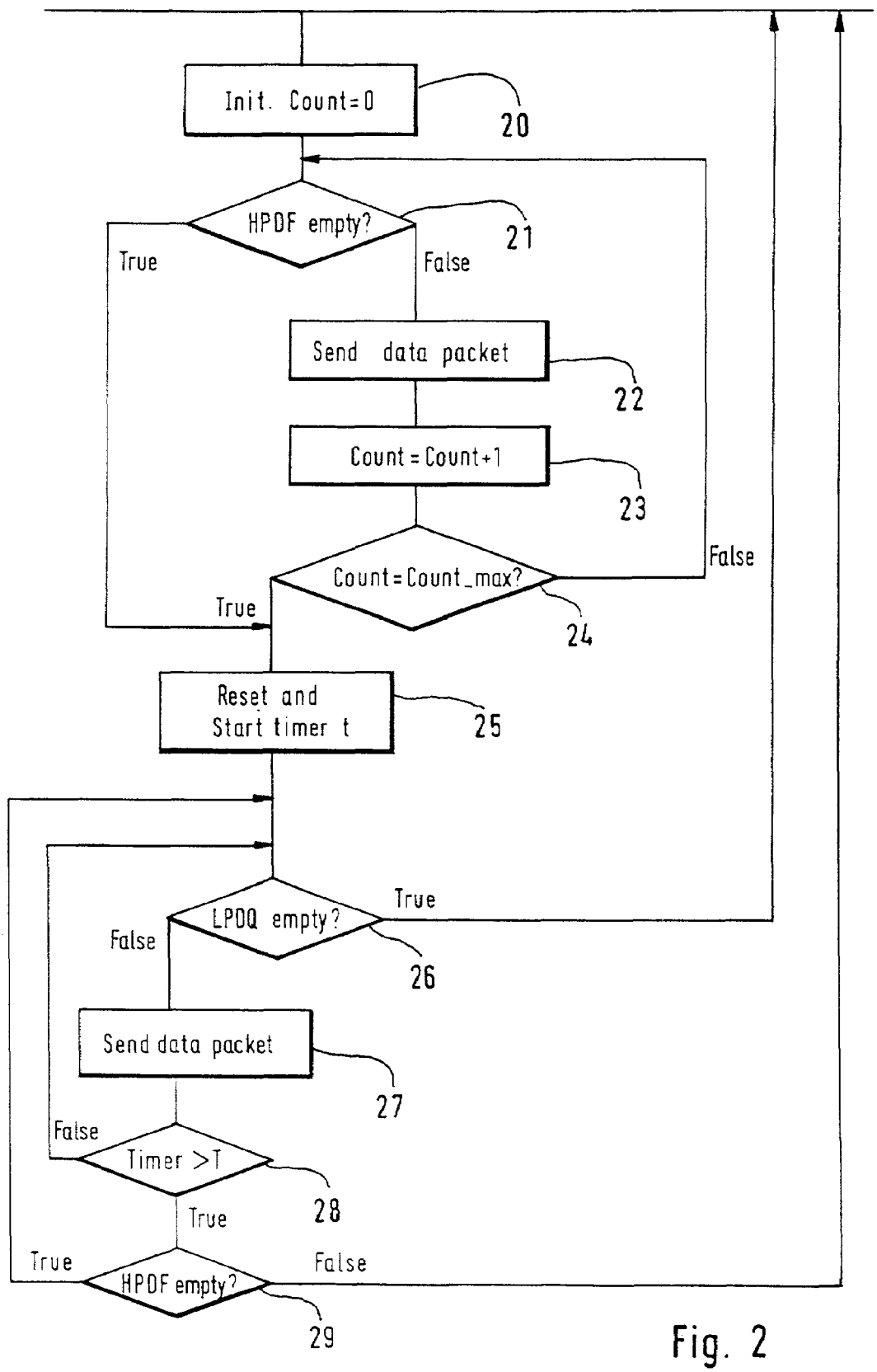
FIG. 2 illustrates an implementation of the method according to the present invention.

FIG. 2 illustrates an implementation of the method according to the present invention.

A variable "Count" is defined. It stores the number of consecutive data packets belonging to high priority data flow 111 transmitted on radio communication channel 12.

A parameter "Count_max" representing the maximum number of consecutive packets belonging to high priority data flow 111 which are allowed to be transmitted on radio communication channel 12 is also defined. This parameter is either a system parameter broadcast on a control channel of the radio communication network or can be negotiated by the transmitter 11 at link establishment or is predetermined depending on the characteristics (e.g. codec type and mode for a voice flow) of the low priority data flow 112 or is predetermined irrespective of the characteristics of the low priority data flow 112.

A timer "t" having a predefined duration T between its setting and expiry is also defined as a system parameter broadcast on a control channel of the radio communication network or negotiated by the transmitter 11 at link establishment or predetermined depending or not on the characteristics of the low priority data flow 112. This timer guarantees a minimum time duration T for data packets belonging to low priority data flow 112 to be transmitted before a further data packet belonging to the high priority data flow is transmitted on radio communication channel 12. The use of this parameter is optional in the framework of the present invention but is used in a preferred embodiment of the invention.

A preferred implementation of the method according to the present invention performed in multiplexer 113 will be described in the following. Each step is either a check or an action.

Step 20 consists in initializing the variable "Count=0" at the beginning of the transmission phase where both data flow 111, 112 have to be multiplexed on radio communication channel 12 or when timer t has expired and there are high priority data packets available for transmission or when the low priority data flow has no more packets available for transmission.

Step 21 consists in checking if high priority data flow 111 is empty. If true step 25 is performed if false step 22 is performed.

Step 22 consists in transmitting one data packet from high priority data flow on the radio communication channel 12 in the next frame.

Step 23 consists in incrementing the variable Count.

Step 24 consists in checking if the variable Count has reach Count_max. If true, step 25 is executed if false step 21 is executed.

Step 25 consists in (re-)setting and starting timer t.

Step 26 consists in checking if low priority data flow 112 is empty. If true step 20 is performed. If false step 27 is performed.

Step 27 consists in transmitting one data packet from the low priority data flow on radio communication channel 12 in the next frame Step 28 consists in checking if timer t has expired. If true step 29 is executed. If false step 26 is executed.

Step 29 consists in checking if high priority data flow 111 is empty. If true step 26 is executed. If false step 20 is performed.

Figure 3:
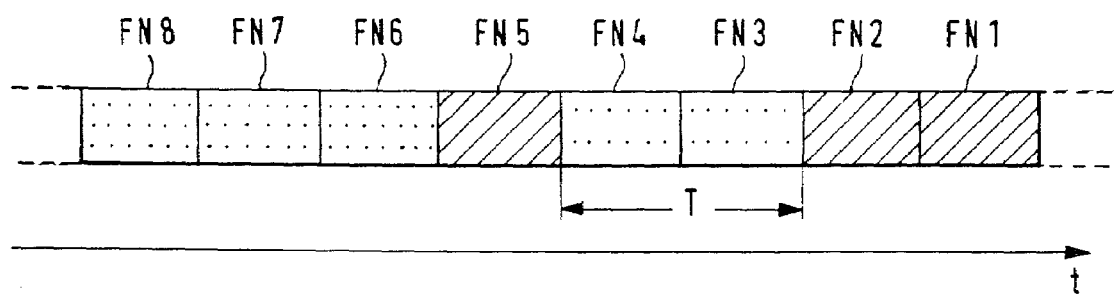
FIG. 3 illustrates the contents of a radio communication channel generated by a transmitter according to the present invention.

FIG. 3 represents a succession of frames FN1, ..., FN8 on a time axis and illustrates an example for the contents of radio communication channel 12 obtained when using the method according to the present invention.

In this example, it is assumed that high priority data flow 111 contains 3 data packets (e.g. representing a segmented signaling message) and low priority data flow 112 contains enough data packet to transmit so that data flow 112 is never empty. These data packets are preferably voice packets. The maximal number of consecutive data packets belonging to high priority data flow (Count_max) is equal to 2, minimum time interval for the transmission of data packets belonging to low priority data flow T is chosen equal to the duration of two frames (40 ms in this example).

According to the algorithm described on FIG. 2. The first two data packets belonging to high priority data flow are transmitted in frame FN1 and FN2. Then during at least 2 frames (40 ms) data packets belonging to low priority data flow are transmitted i.e. in frames FN3 and FN4. Then, high priority data flow is checked once more and the third data packet is transmitted in frame FN5. Since no more data packet remain for transmission in high priority data flow, data packets from low priority data flow can be transmitted in frames FN6 to FN8 and the followings.

It can be envisaged that any new data packet entering the high priority data flow 111 interrupts the transmission of data packets belonging to low priority data flow 112 unless the last interruption happened less than T seconds ago. This is referred in the art as preemptive or stealing mode.

Further adaptations of the presented algorithm can be imagined by a man skilled in the art without departing from the general advantages of the present invention.

The values for Count_max and the timer duration T are preferably set depending on the results of simulations which will determine the acceptable quality degradation of the real-time low priority flow 112 when the latter is interrupted by the transmission of data packets belonging to high priority data flow (i.e. when the logical channel carrying the real-time flow is pre-empted by the logical channel carrying signaling or, in the case of GERAN, when a fast access channel (FACCH) pre-empts a traffic Channel(TCH)).

In case of a voice call, the speech quality degradation depends among other things on the codec type, the codec mode, the codec rate (full-rate, half-rate, quarter-rate), as a consequence the value of Count_max and T should preferably be chosen dependent on the codec used for coding speech before transmission on the radio communication channel.

The method according the present invention allows mitigating the real-time data flow quality degradation without increasing unnecessarily the time delivery of layer-3 signaling messages segmented in several data packets. Indeed, messages shorter than Count_max data packets after segmentation will be sent in one round, provided there are no more outstanding unacknowledged data packets in the sending window. The transfer time is therefore limited to maximum Count max*20 msec+one single-trip delay for such messages (compared to Count_max*(40 msec+round trip delay) with a LAPDm approach as described in prior art) in the case of a full-rate high priority data flow. For messages longer than Count_max data packets after segmentation, the transfer time is also reduced since T can be chosen shorter than a round-trip delay.

In the case of GERAN, the application of the method according to the present invention would consist in modifying the currently used RLC (Radio Link Control) protocol as defined in the specification 3GPP TS 44.060. The RLC protocol is preferably modified with the introduction of two new parameters: Count_max and T. In a possible embodiment, the value of Count_max is set equal to the window size used in the RLC protocol, and T is set equal to a round trip delay.

As apparent to a man skilled in the art, this invention can be generalized to any layer 2 protocol and not only to RLC.

Figure 4:
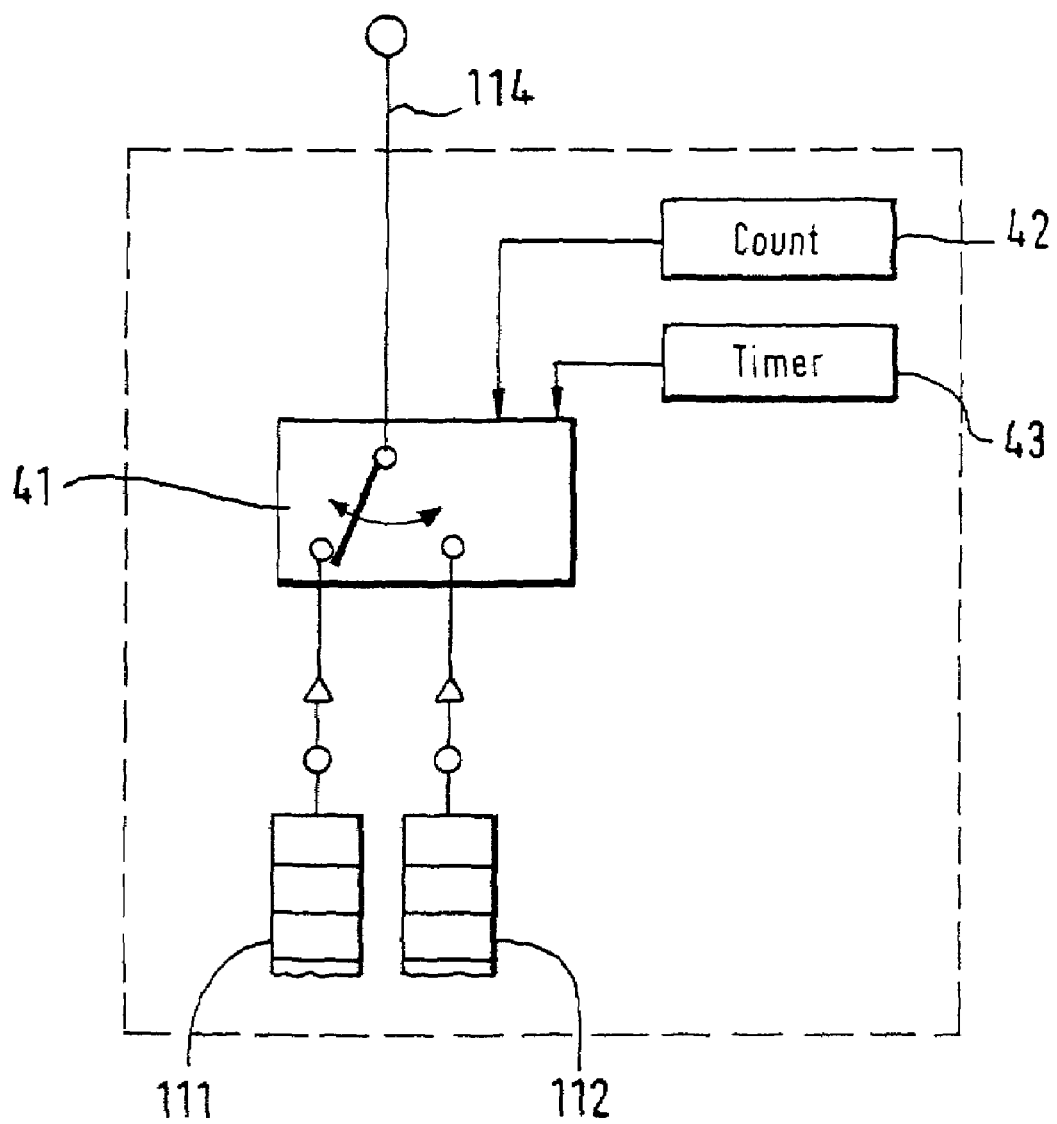
FIG. 4 shows an embodiment of the transmitter according to the present invention.

FIG. 4 shows an embodiment of a transmitter according to the present invention. As already mentioned in FIG. 1 a transmitter according to the present invention comprises a high priority data flow 111, a low priority data flow 112, a multiplexer 113 and an antenna 114 for transmitting data packets on radio communication channel 12. Multiplexer 113 comprises a switch 41 having two possible positions. The switch 41 enables either the high priority data flow or the low priority data flow to transmit data packets on radio communication channel 12. Switch 41 is controlled by a control module comprising means 42 for counting the number of consecutive data packets belonging to the high priority data flow transmitted since the transmission of the latest data packet belonging to said low priority data flow. The control module further comprises a timer 43 for guaranteeing a minimum time interval for the transmission of available data packets belonging to the low priority data flow before transmission of further data packets belonging to the high priority data flow.

The invention claimed is:

1. A method for multiplexing data packets of a high priority data flow and a low priority data flow on a radio communication channel of a radio communication network, said method comprising the steps of:

transmitting, if available, at least one data packet belonging to said low priority data flow when a number of consecutive data packets belonging to said high priority data flow transmitted since the transmission of a data packet belonging to said low priority data flow has reached a predefined number;

wherein said predefined number depends on a codec used for coding said low priority data flow, before transmission on said radio communication channel.

2. The method according to claim 1, further comprising: setting a minimum time interval for said step of transmitting available data packets belonging to said low priority data flow.

3. The method according to claim 1, wherein said minimum time interval depends on the codec used for coding said low priority data flow, before transmission on said radio communication channel.

4. The method according to claim 1, wherein said high priority data flow uses a retransmission protocol for transmitting said data packets.

5. The method according to claim 4, wherein said retransmission protocol is a Radio Link Control Protocol as specified in TS 3GPP 44.060.

6. The method according to claim 1, wherein said high priority data flow consists in signaling messages and said low priority data flow consists in real time traffic data.

7. The method according to claim 1, where said method is used in a GPRS (General Packet Radio Service) or EDGE (Enhanced Data rate for GSM Evolution) Radio Access Network using a layer 2 protocol which has a window size higher than one.

8. A method for multiplexing data packets of a high priority data flow and a low priority data flow on a radio communication channel of a radio communication network, said method comprising the steps of:
transmitting, if available, at least one data packet belonging to said low priority data flow when a number of consecutive data packets belonging to said high priority data flow transmitted since the last transmission of a data packet belonging to said low priority data flow has reached a predefined number;
setting a minimum time interval for said step of transmitting available data packets belonging to said low priority data flow,
wherein said minimum time interval is at least equal to a round trip delay required for one or more data packets belonging to said high priority data flow to be acknowledged at a transmitter by a retransmission protocol.

9. The method according to claim 6, wherein said minimum time interval and said predefined number are negotiated by said transmitter at link establishment.

10. A transmitter of a radio communication network comprising:

means for multiplexing at least two data flows, a high priority data flow and a low priority data flow, on a radio communication channel, each of said data flows comprising data packets to be transmitted on said radio communication channel, wherein said means for multiplexing at least two data flows comprises:
means for counting a number of consecutive data packets belonging to said high priority data flow transmitted since transmission of data packet belonging to said low priority data flow;
means for enabling transmission, if available, of another data packet belonging to said low priority data flow if said number of consecutive data packets belonging to said high priority data flow has reached a predefined number of data packets, wherein said predefined number depends on a codec used for coding said low priority data flow, before transmission on said radio communication channel.

11. The transmitter according to claim 10, further comprising:
a timer operative to set a minimum time interval for the transmission of available data packets belonging to said low priority data flow when the number of consecutive data packets belonging to said high priority data flow has reached said predefined number of data packets;
means for disabling the transmission of data packets belonging to said high priority data flow when said timer is started; and
means for enabling again the transmission of data packets belonging to said high priority data flow upon expiration of said timer.

* * * * *